(12) United States Patent
Denzler et al.

(10) Patent No.: US 12,023,835 B2
(45) Date of Patent: Jul. 2, 2024

(54) INJECTION MOULDING MACHINE

(71) Applicant: KRAUSSMAFFEI HIGHPERFORMANCE AG, Näfels (CH)

(72) Inventors: Björn Denzler, Rapperswil-Jona (CH); Daniel Müller, Kaltbrunn (CH); Manfred Hausmann, Mollis (CH)

(73) Assignee: NETSTAL MASCHINEN AG, Näfels (CH)

( * ) Notice: Subject to any disclaimer, the term of this patent is extended or adjusted under 35 U.S.C. 154(b) by 207 days.

(21) Appl. No.: 16/968,229

(22) PCT Filed: Mar. 4, 2019

(86) PCT No.: PCT/EP2019/055334
§ 371 (c)(1),
(2) Date: Aug. 7, 2020

(87) PCT Pub. No.: WO2019/170611
PCT Pub. Date: Sep. 12, 2019

(65) Prior Publication Data
US 2021/0031424 A1 Feb. 4, 2021

(30) Foreign Application Priority Data
Mar. 5, 2018 (DE) ...................... 10 2018 104 937.4

(51) Int. Cl.
*B29C 45/76* (2006.01)
(52) U.S. Cl.
CPC .... *B29C 45/762* (2013.01); *B29C 2045/7606* (2013.01); *B29C 2945/76916* (2013.01); *B29C 2945/76919* (2013.01)
(58) Field of Classification Search
CPC .......... B29C 45/762; B29C 2045/7606; B29C 2945/76916; B29C 2945/76919;
(Continued)

(56) References Cited

U.S. PATENT DOCUMENTS

| 2004/0093097 A1 | 5/2004 | Nishizawa et al. |
| 2005/0116023 A1 | 6/2005 | Amundson et al. |

(Continued)

FOREIGN PATENT DOCUMENTS

| DE | 20214899 U1 | 2/2003 |
| EP | 2100197 A1 | 9/2009 |

(Continued)

OTHER PUBLICATIONS

International Search Report for PCT/EP2019/055334 dated Jul. 4, 2019.
Written Opinion for PCT/EP2019/055334 dated Jul. 4, 2019.

*Primary Examiner* — S. Behrooz Ghorishi
(74) *Attorney, Agent, or Firm* — Pearne & Gordon LLP

(57) ABSTRACT

An injection moulding machine having a machine controller and a control unit, capable of starting up the injection moulding machine from a switched-off mode or a standby mode into a production operation for producing injection-moulded parts and to shut down back into a switched-off or standby mode. Start-up and shutdown of the injection moulding machine are each divided into a number of phases, and a sequence of specific machine movement commands and/or specific machine mode change commands is pre-programmed for each phase of start-up and for each phase of shutdown. One or more control elements are provided on the control unit which, when actuated, activate a pre-programmed sequence so that a phase of start-up or shutdown can be started, the functions of start-up or shutdown of the injection moulding machine associated with the machine movement command and/or the machine mode change command of this sequence then being triggered.

14 Claims, 10 Drawing Sheets

(58) Field of Classification Search
CPC ..... B29C 45/76; B29C 45/03; B29C 45/7666; B29C 2037/903; B29C 2037/906; Y02P 90/02; G06F 1/181; G06F 3/0219; G06F 3/023; G06F 3/0483; G06F 3/0362; G06F 3/0482; G05B 2219/35439; G05B 2219/45244; G05B 19/409
See application file for complete search history.

(56) References Cited

U.S. PATENT DOCUMENTS

| | | | |
|---|---|---|---|
| 2010/0138031 A1* | 6/2010 | Werfeli | G06F 3/04886 715/702 |
| 2014/0156059 A1* | 6/2014 | Dimmler | G05B 19/409 700/200 |
| 2015/0243872 A1* | 8/2015 | Danis | H10N 10/17 136/201 |
| 2018/0117815 A1* | 5/2018 | Miyazaki | B29C 45/14311 |
| 2020/0230856 A1* | 7/2020 | Enomoto | B29C 45/64 |

FOREIGN PATENT DOCUMENTS

| | | |
|---|---|---|
| EP | 2644354 A2 | 10/2013 |
| EP | 2735425 A2 | 5/2014 |
| EP | 2100197 B1 | 8/2016 |

* cited by examiner

Starting up - Phase 1 - "Start-up"

The individual symbols or icons here (from left to right) have the following meaning:

50 — Marks the start of the phase (process)

55 — Switch on the heating for the first plasticizing

Switch on the heating for the second plasticizing (if present)

Switch on the heating for the block zones

Wait until all block zones have reached a predefined temperature

Switch on all cooling water

Switch on the external heating apparatus

Switch on the heating for the tool nozzles

Switch on the drive

Wait until all heating zones have reached the desired temperature

51 — Marks the end of Phase 1

Fig. 10

Shutting down - Phase 3 = "Switch-off"

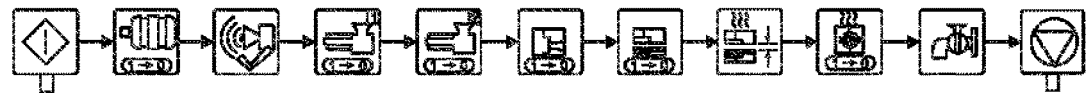

with

 Switch off drive

 Acknowledge alarms

 Switch off the heating for the first plasticizing

 Switch off the heating for the second plasticizing (if present)

 Switch off the heating for the tool nozzles

 Switch off the heating for the block zones

 Wait until all block zones have fallen below a predefined temperature

 Switch off the external heating apparatus

 Switch off all cooling water

INJECTION MOULDING MACHINE

CROSS-REFERENCE TO RELATED APPLICATIONS

This is a National Stage application of PCT international application PCT/EP2019/055334 filed on Mar. 4, 2019, which claims the priority of German Patent Application No. 10 2018 104 937.4, filed Mar. 5, 2018, which are incorporated herein by reference in their entireties.

Field of the Invention

The invention relates to an injection moulding machine according to the introductory clause of Claim 1.

Background of the Invention

An injection moulding machine is distinguished by a cyclic and generally fully automatic production operation, wherein in each cycle one or more injection-moulded shaped parts are produced. Before start-up, a process programming is to be carried out. This concerns the programming of an injection moulding cycle for the production of a particular shaped part. The carrying out of a process programming takes place by means of a control unit designed as a man-machine interface, and a machine controller.

The production operation is to be differentiated herefrom. This is to be understood to be the state of the injection moulding machine in which injection-moulded shaped parts are produced usually fully automatically—but if applicable also by manual operation. An injection moulding machine which is set up in finished form and programmed for the production of quite specific shaped parts must then be started and brought into production operation. After completion of the production, the injection moulding machine is to be brought out of production operation and into a switched-off state. Preferably here, a transition does not take place directly from the production operation into the switched-off state, but rather firstly injecting-out or emptying is carried out, and the injection moulding machine is only switched off thereafter. Instead of the complete switching off of the injection moulding machine, it can also be brought into a waiting state, which can also be designated as "standby". This situation is comparable with a computer. After the switching on or respectively starting of the computer, it must firstly be brought into an operating state, which is also designated by the term starting-up of the computer. After completion of working on the computer, the operating state is left and the computer is shut down, wherein likewise a "standby" state can be maintained or the computer can be switched off completely. Therefore, one can also speak here in terms of the "starting up" of the injection moulding machine on the one hand and of the "shutting down" of the injection moulding machine on the other hand. "Starting up" of the injection moulding machine is to be understood here to mean the process in which the injection moulding machine is started up from a completely switched-off state or from a standby state, until it has reached the state for the production operation. "Shutting down" the injection moulding machine is to be understood to mean the process in which the state for the production operation is ended and the injection moulding machine is brought into a completely switched off state or into a standby state. A suitable control unit and a machine controller can be used for the starting up and the shutting down of an injection moulding machine.

From the prior art, control units with a plurality of keys are known (EP2100197B1), which are available to an operator as inputting possibilities. An operator must therefore actuate suitable keys for a plurality of cases of application, in order to start up an injection moulding machine from a switched off state into a production operation, and to shut down the injection moulding machine again into a completely switched off state or into a standby state. Depending on the case of application or respectively depending on which shaped part is to be produced, different requirements are set for the starting up and the shutting down of the injection moulding machine. The active keys available or made available to an operator for this also vary accordingly. Active keys are to be understood to mean those keys or inputting possibilities which are assigned with a specific function and on the actuation of which this function is triggered. Here, depending on the operating state of the injection moulding machine, different functions can be associated with a key, as is known from EP2100197B1. Keys which are in fact present but are not required at that time are to be differentiated herefrom.

In order to start up an injection moulding machine in a proper an error-free manner and to bring it into fully automatic production operation, generally application-specific knowledge is necessary. The steps which are to be carried out for this are very numerous and are highly dependent on the shaped part which is to be produced. Therefore, in most cases, advanced knowledge of the injection moulding machine and of the application are necessary in order to be able to employ the keys, available on the control unit or made available if needed, as inputting possibilities correctly and at the right point in time. An experienced application engineer, i.e. an operator with knowledge of the injection moulding machine and its application is able to correctly carry out the starting up and the shutting down of the injection moulding machine by means of the provided keys or respectively inputting possibilities of the control unit.

However, an increasing need exists for operators with a lower technical qualification, in particular in order to be able to reduce the personnel costs in the operation of an injection moulding machine. Nevertheless, in the use of such operators, it is also be ensured that a proper operation of the injection moulding machine is to be ensured and fault-free shaped parts can be produced thereon, and namely without a training for these operators being necessary which is tailored specifically to their needs. In particular, the starting up and the shutting down of an injection moulding machine are also to be able to be carried out reliably by such operators.

Proceeding herefrom, the invention is based on the problem of indicating an injection moulding machine in which the operation is simplified in such a way that an operator only has to actuate one control element or a small number of control elements in order to start up the injection moulding machine into production operation and to shut it down again out of the production operation, wherein the control is to always be identical, irrespective of the shaped part which is produced on the injection moulding machine, and wherein the operator in addition does not have to have application-specific knowledge.

BRIEF SUMMARY OF THE INVENTION

The solution to this problem takes place by an injection moulding machine with the features of Claim 1. Advantageous configurations and further developments are to be found in the subclaims.

According to the invention, the starting up of the injection moulding machine and the shutting down of the injection moulding machine are divided respectively into several phases, and for each phase of starting up and for each phase of shutting down specific machine movement commands and/or specific machine state change commands are provided, the execution of which is necessary for carrying out the respective phase. For each phase, a sequence, characteristic for this phase, of specific machine movement commands and/or machine state change commands is pre-programmed. One or more control elements are provided on the control unit, on the actuation of which control elements a pre-programmed sequence can be activated and a phase of the starting up or of the shutting down of the injection moulding machine can be started. Thereby, the functions of starting up or of shutting down the injection moulding machine associated with the machine movement commands and/or with the machine state change commands of this sequence are triggered.

The control element(s) can be provided in various embodiments and can be pre-programmed for their function. A pre-programmed control element means that on its actuation a specific sequence can be started.

According to an embodiment, a control element, designed as start-up key, for starting up the injection moulding machine, and a control element, designed as a shut-down key for shutting down the injection moulding machine are provided. By the actuation of the start-up key a phase of starting up can be started, and in so doing a sequence, pre-programmed for this phase of starting up, of specific machine movement commands and/or machine state change commands can be activated, wherein according to the pre-programmed process, the functions of starting up of the injection moulding machine, associated with these machine movement commands and/or machine state change commands, are triggered. Accordingly, through the actuation of the shut-down key a phase of shutting down can be triggered and in so doing a sequence, pre-programmed for this phase of shutting down, of specific machine movement commands and/or machine state change commands can be activated, wherein according to the pre-programmed process, the functions of shutting down of the injection moulding machine associated with these machine movement commands and/or machine state change commands, are triggered.

The division of the starting up and of the shutting down of the injection moulding machine into several phase means as follows: On running through a phase, the operating state of the injection moulding machine is changed and namely in such a manner that the operating state of the injection moulding machine is changed from a state before the starting of the phase or respectively at the start of the phase up to the next state at the end of the phase. The operating state of the injection moulding machine is therefore changed from phase to phase.

Thereby, the controlling on starting up and on shutting down of the injection moulding machine becomes simpler for the machine operator and more reliable. The term "machine operator" is to be understood to mean an operator who has no or only minimal process knowledge. Generally, a machine operator has the task of monitoring the proper operation of the injection moulding machine and to possibly carry out minor quality controls. An application engineer is to be differentiated herefrom. The term "application engineer" is to be understood to mean an operator who has an advanced process knowledge. An application engineer is generally able to program an injection moulding cycle. In the present case, it is the responsibility of an application engineer to program the control elements or respectively the keys which are made available to a machine operator for starting up and for shutting down the injection moulding machine. The sequence of machine movement commands and/or machine state change commands of a phase is pre-programmed by an application engineer and is carried out by a machine operator when the latter actuates the control elements or respectively the keys for starting up and for shutting down the injection moulding machine.

Thereby, the training expenditure for the operator is massively reduced. For the operation of the injection moulding machine, operators can be used who need to have no or only rudimentary knowledge of the injection moulding machine and the process for the production of a specific shaped part.

The starting up and the shutting down of the injection moulding machine can be divided into several phases, wherein the operating state of the injection moulding machine is changed from phase to phase. Preferably, the starting up and the shutting down of the injection moulding machine can be divided into three phases, which lie between four operating states—or abbreviated as states—of the injection moulding machine. This is to be described in further detail below with reference to FIG. 1.

Firstly, the following states of the injection moulding machine can be defined:

State No. (1)—"OFF"

The injection moulding machine is situated either in a completely switched-off state (i.e. no energy supply) or the injection machine is indeed switched on, but is not yet ready for operation. In this state, the controller of the injection moulding machine is switched on, but all the actuators (motors, heating arrangements, cooling water and peripherals etc.) are switched off. In this state, the injection moulding machine can be at a standstill for several hours without, in so doing, much energy being required. Work can be carried out with the controller (loading data set, setting parameters etc.), but movements on the machine are not possible.

State No. (1')="Standby"

This concerns an intermediate state, able to be started if required, which is distinguished in that energy is saved and plastic material present in the plasticizing unit is conserved. Preferably, however, before the starting of the "standby" state, the plasticizing is to be injected to empty. Generally, in this "standby" state, the drives are switched off and the heating arrangements are set to reduced temperatures. This state is then usefully to be occupied when the production is interrupted due to a fault for a prolonged period of time, and after rectification of the problem the production is to be resumed. As the heating arrangements are only reduced and are not completely switched off, the lengthy heating-up of the temperature zones in the resumption of production is reduced.

State No. (2)="ON"

The injection moulding machine is ready for operation. This means that all the required actuators are switched on and all the temperature zones are in the desired range. In this state, the individual actuators/axes of the injection moulding machine can indeed be used, but the state of the plastic in the plasticizing unit is not defined. Possibly, old plastic is situated therein, which must first be injected out, or else the plasticizing unit is still empty.

State No. (3)="READY"

The machine is ready for the production. In this state, the correct amount of plastic is situated in the plasticizing unit, so that the production can be started. The plastic in the plasticizing unit is of good quality, which means that injecting-out took place beforehand, if necessary. All axes are in the basic position for starting the production.

State No. (4)="PRODUCING"

The injection moulding machine is in fully automatic production operation; injection-moulded shaped parts are being produced.

The phases of starting up and of shutting down of the injection moulding machine lie between the above-mentioned states.

Starting up of the injection moulding machine (left-hand arrow in FIG. 1)

Phase="Start"

In this process the injection moulding machine is switched on and some assemblies or machine parts are activated. This process lasts a relatively long time. Individual actuators must be switched on at the correct point in time.

Furthermore, the reaching of particular temperatures of individual zones of the plasticizing unit or in the tool or of entire assemblies on the injection moulding machine, including the tool, is important.

Phase="Preparation"

In this phase, it must be ensured that the plastic material which is to be used later for the production is of sufficient quality. Residues in the plasticizing unit must be injected out and the new plastic material must be metered without bubbles and residues. For this, the operator must bring the plasticizing unit into the so-called injecting-out position, inject out several times and finally advance it again into the secure region. Depending on the case of application, the plasticizing unit can dock against the tool in this phase or only at the start of the production. Depending on the tool/application, the mould must be closed or respectively open here. At the very end, all axes are brought into the starting position, in order to be able to start the production in the next phase.

Phase 3="Start of production"

After the injection moulding machine and the plastic material are prepared, this phase concerns starting and taking up the automatic production operation. As the beginning of the production operation, generally individual injection moulding cycles are run, in order to be able to ensure that all the shaped parts have been injected correctly (i.e. all cavities filled correctly) and ejected cleanly. A changeover into the fully automatic production operation only takes place after the operator is satisfied that everything is functioning properly. The fully automatic production operation is distinguished in that the pre-programmed injection moulding cycles run automatically and repetitively injection-moulded shaped parts are produced.

On reaching the production target or in the case of an interruption, the operator must be able to properly shut down and switch off the injection moulding machine from the production operation again or bring it into a standby state. In an analogous manner to the starting up of the injection moulding machine, this process can also be divided into three phases:

Shutting down of the injection moulding machine (right-hand arrow in FIG. 1)

Phase 1="End production"

So that no half-finished shaped parts and plastic is wasted unnecessarily, the production operation must be ended properly. Depending on the application and the requirements of the operation, specific states are to be taken up at the end of the production (e.g. injection moulding tool remains closed).

Phase 2=Post-processing

In this phase, plastic which is still situated in the plasticizing unit, is injected out, so that the plasticizing unit at the next use contains as little plastic as possible which has already been plasticized once. In addition, axes can be moved to specific positions, if required.

Phase 3=Switch-off

The switching off of the motors and heating arrangements and of the cooling water must run in a specific sequence, so that no damage occurs to the tool and machine. Here, in particular, the temperatures in the tool and plasticizing unit are crucial for the switching off of individual actuators.

The control unit provides a plurality of keys for all the above-mentioned phases, in order to be able to trigger specific actions and to realize specific states. Here, specific symbols are used, by which the function is visualized, which is triggered on actuating a thus characterized key. Such keys can be configured as mechanical keys (hardware keys) or as touchscreen keys (software keys). In addition, on the control unit there is a sequence editor, by which the process of the injection moulding cycle or other (partial) processes or respectively process sequences—in broad terms sequences—of the injection moulding machine can be programmed. In the sequence editor, a plurality of commands are made available to an operator, wherein generally identical or similar symbols are used as in the above-mentioned keys. Instead of the term "symbol", frequently the term "icon" is also used. Whereas with the actuation of a key the function belonging hereto is triggered immediately, the functions belonging to the commands are only triggered when the process or respectively partial process or sequence programmed with these commands is started.

In FIGS. 10 to 15, a typical selection of symbols or respectively icons is to be illustrated and briefly described for each above-mentioned phase.

The symbols 50 and 51 have consistently the same meaning, so that a renewed indication of their meaning can be dispensed with in the following.

A differentiation can be made between symbols for functions concerning a machine movement and symbols for functions concerning a change in the machine state.

Consequently, there are machine movement keys, i.e. keys, on the actuation of which an assembly or an individual part of a machine is moved, and there are machine movement commands, i.e. commands, on the execution of which an assembly or an individual part of a machine is moved. An example of a machine movement is the symbol:
52 Advance injection unit Also the keys and commands which concern the conveying of plastic material can be regarded as machine movement keys or respectively machine movement commands, because parts of the injection moulding machine are moved there. This concerns for example the following symbols:
53 Switch on/open material feed
54 Inject out With regard to the change of state of the machine, there are machine state change keys, i.e. keys on the actuation of which the state of the injection moulding machine is changed, wherein the state change relates to an assembly or one or more parts of the injection moulding machine Likewise, there are machine state change commands, i.e. commands, on the execution of which the state of the injection moulding machine is changed, wherein the state change relates to an assembly or one or more parts of the injection moulding machine.

Examples of this are:
55 Heating on/off
56 Cooling water on/off

The machine movement keys and/or the machine state change keys can be configured as mechanical keys (hardware keys) or as touchscreen keys (software keys). The machine movement keys and the machine state change keys have a suitable symbol on or in a region around the respective key. In the case of the machine movement keys, the symbol indicates which assembly or which part of the injection moulding machine is moved on actuation of the machine movement key, and if applicable also the direction of the movement and the purpose of the movement (e.g. open mould, close mould). In the case of the machine state change keys, the symbol indicates which state is to be changed and, if applicable, reached; if applicable, the symbol can also indicate how the state change is to be brought about (e.g. heating a zone; switching on/switching off cooling water).

The machine movement commands and the machine state change commands can be provided as a symbol or icon on the screen of the sequence editor.

According to a core idea of the present invention, the machine movement keys and machine state change keys specified for each phase of starting up and for each phase of shutting down are not selected and actuated individually, but rather a pre-programming takes place. In this pre-programming, machine movement commands and/or machine state change commands are put together in the sequence editor to form a sequence of commands.

Such a sequence editor is known in itself in the programming of production sequences in injection moulding machines. By means of such a sequence editor, production sequences or generally process steps in the operation of an injection moulding machine can be inputted by an operator into the control unit of the injection moulding machine, in particular in order to program a machine sequence. One also speaks in terms of a sequence programming of an injection moulding machine. Here, input masks are made available to an operator on the control unit of the injection moulding machine, and symbols/icons/keys deposited with commands are shown therein, which the operator can select in order to actuate a part or respectively a component or an assembly of an injection moulding machine according to this command (machine movement commands) or in order to change a state of a part or respectively a component or an assembly according to this command (machine state change commands).

Examples of such commands have been described in further detail above.

In the pre-programming of sequences of machine movement commands and/or machine state change commands belonging to the present invention, the concern is therefore with making a suitable selection from a store of machine movement commands and machine state change commands, and to put them together to form a sequence of the starting up or respectively shutting down of an injection moulding machine. This pre-programming can take place on the control unit of the injection moulding machine itself, in particular before this injection moulding machine is delivered to a customer. It can also be carried out at a later time by an application engineer or by a specialist for sequence programming at the customer's location, in particular by persons with corresponding knowledge in-house from the manufacturer of the injection moulding machine. However, the pre-programming can also be carried out separately from an injection moulding machine on a computer. Here, a store of machine movement commands and of machine state change commands is held ready in a memory device and is available for the pre-programming of sequences. This can concern a memory device which is integrated into the computer, or a separate memory device, such as for example a computer-readably memory medium, an external hard disk, a USB stick or suchlike. An application engineer or a specialist for the sequence programming of an injection moulding machine can therefore select machine movement commands and machine state change commands separately from a specific injection moulding machine on the computer and can put them together to form a desired sequence. Here, a user interface can be provided on the computer, which user interface corresponds to or replicates a sequence editor in the sequence programming of an injection moulding machine. The application engineer or respectively the specialist for sequence programming can therefore also carry out, in a simple manner in a user interface with which he is familiar, the pre-programing of the sequences for the starting up and the shutting down of the injection moulding machine.

As a result, a pre-programmed sequence concerns a computer program which runs during the starting up or during the shutting down of the injection moulding machine. For each phase of the starting up and for each phase of the shutting down of an injection moulding machine, there is therefore respectively a computer program which is started at the starting of a phase. As the starting up or respectively the shutting down of an injection moulding machine is divided into several phases, several of the above-mentioned computer programs are executed during the starting up or respectively the shutting down, namely the computer programs of the respective sequences. Accordingly, a succession of computer programs for the starting up and a succession of computer programs for the shutting down can be identified. Each of the above-mentioned successions can therefore be designated as overall program for the starting up or respectively as overall program for the shutting down. The computer programs of the individual sequences and/or the overall programs can be stored on computer-readable memory media/data carriers and held ready, so that they can be read at any desired point in time into the machine controller of an injection moulding machine. A computer-readable medium can therefore comprise computer programs of the individual sequences and/or one or more overall programs. Basically, it is therefore possible to deliver an injection moulding machine without the possibility, according to the invention, for simplified starting up and shutting down, and to equip it or respectively retrofit it at a later point in time with the invention which is described here. It is merely necessary that the computer programs of the sequences suitable for this injection moulding machine or the overall programs suitable for this injection moulding machine are read into the machine controller of this injection moulding machine.

Therefore, a computer program product also belongs to the present invention, said computer program product comprising pre-programmed sequences of machine movement commands and/or machine state change commands, wherein the sequences are formed, in order to be able to start up the injection moulding machine from a switched-off state or from a standby state into a production operation for the production of injection-moulded shaped parts, and in order to be able to shut down from the production operation back into a switched-off or a standby state, wherein the starting up of the injection moulding machine and the shutting down of the injection moulding machine is divided respectively into several phases, and wherein for each phase of the starting up and for each phase of the shutting down a sequence of specific machine movement commands and/or specific machine state change commands is pre-programmed. The commands (instructions) of the computer program or respectively of the computer program product therefore bring about, on their execution, that the injection moulding machine is started up from a switched-off state or from a standby state into a production operation for the production of injection-moulded shaped parts and is shut down from the production operation back into a switched-off or a standby state. It can also be stated that the computer program comprises commands or respectively instructions, namely machine movement commands and/or machine state change commands, which on the execution of the program by a computer, in particular on the execution of the program by a computer integrated in the machine controller of the injection moulding machine, cause this computer to execute the steps of starting up and—at a later point in time—of shutting down the injection moulding machine. Such a computer which is integrated in the machine controller can also be merely a processor (CPU), which is suitable and provided for the reading in and the execution of the computer program. The computer program can be held ready on a data carrier, which the processor can access. The data carrier can be integrated in the machine controller or it can be an external data carrier which the processor can access. If applicable, an external data carrier can be connected to the machine controller (e.g. via USB, LAN, Bluetooth or suchlike), and the computer program can be transferred into an internal data memory in the machine controller. In the execution of the program, for each phase of starting up and for each phase of shutting down a sequence of commands is carried out, which is pre-programmed for the respective phase. In the execution of the program, provision can be made that at the beginning or at the end of a phase the execution of the program is stopped and is only continued after an input by an operator. Preferably, the interruption of the execution of the program takes place respectively at the beginning of a phase. Additionally, in selected phases, a command can be included at any desired place, which requires an input by the operator.

A succession of sequences for the starting up and/or a succession of sequences for the shutting down can be put together respectively to form an overall program of starting up and/or an overall program of shutting down. Therefore, one can speak in terms of a first succession of computer programs for the starting up as overall program of starting up, and of a second succession of computer programs for the shutting down as overall program for shutting down.

On the control unit one or more control elements are provided, at the actuation of which the computer program belonging to a pre-programmed sequence is activated and a phase of starting up or of shutting down in started. With the start of a phase, the computer program of this sequence is started off, wherein the functions of starting up or of shutting down of the injection moulding machine associated with the machine movement commands and/or with the machine state change commands of this sequence are triggered.

A computer-readable medium, in particular a computer-readable data carrier, on which a computer program product according to the invention is stored, belongs further to the present invention. A computer program product according to the invention can be stored for example on an external hard disk, on an optically readably data carrier, a USB stick or suchlike.

Here, machine movement commands and machine state change commands can be put together in the desired succession. In general, it can be stated that a phase of starting up or respectively a phase of shutting down is formed by a sequence of commands. Here, machine movement commands and/or machine state change commands are put together to form a sequence. On starting a phase, the sequence of commands which is pre-programmed for this phase is started off by the machine controller, the functions belonging to the commands are triggered and, in so doing, the injection moulding machine is brought from an operating state at the beginning of the phase into an operating state at the end of the phase.

Instead of the actuation of individual machine movement keys and/or of individual machine state change keys, machine movement commands and/or machine state change commands are put together to form a sequence, and a process belonging hereto is programmed, which is triggered when a control element or respectively a key of the starting up or respectively of the shutting down is actuated. A machine operator therefore only needs to actuate a key of the starting up or respectively of the shutting down, and the functions belonging hereto run automatically. The operator therefore does not have to actuate the individual machine movement keys and machine state change keys, but rather only one start-up key or one shut-down key.

In the above-mentioned phases, the machine movement commands and machine state change commands lying between the symbols 50 and 51 form by way of example respectively a sequence which is characteristic for a phase.

According to an embodiment of the invention, precisely one start-up key can be provided, which is configured or respectively programmed in such a way that through repeated actuating of this start-up key the respectively next available phase of starting up can be started.

Likewise, precisely one shut-down key can be provided, which is configured or respectively programmed in such a way that though repeated actuating of this shut-down key the respectively next available phase of shutting down can be started.

In the simplest case, therefore, there is only one key for starting up the injection moulding machine (start-up key) and one key for shutting down the injection moulding machine (shut-down key), which by actuating several times brings about a starting and processing of the respective phases and of the sequences, pre-programmed for this, of machine movement commands and machine state change commands.

However, several start-up or respectively shut-down keys can also be provided, which are characterized so that they belong to the phase which is to be triggered and started off. Here, an arrangement of these keys can be provided adjacent to one another, beneath one another, above one another or in another manner. It only has to be easily identifiable, which key belongs to which phase. Also, a rotary knob can also be provided as control element, which is either rotated further in order to arrive from one phase to the next phase, or which can be pressed several times. Basically, each control element is conceivable as start-up key or respectively as shut-down key, on the actuation of which the process of a phase and the sequence which is pre-programmed for this can be started or respectively triggered.

If applicable, additional start-up and/or shut-down keys can be provided, on the actuation of which a predefined intermediate state can be started up. For example, an additional start-up key can be provided, in order to bring the injection moulding machine from the switched-off state into the standby state. In an analogous manner hereto, an additional shut-down key can be provided, in order to shut down the injection moulding machine from the switched-on state into the standby state.

According to a further embodiment of the invention, the start-up key can be provided with an upwardly pointing arrow or such an arrow can be associated with the start-up key. Additionally or alternatively thereto, the start-up key can be coloured or able to be illuminated in colour, preferably in a green colour. Furthermore, the shut-down key can be provided with a downwardly pointing arrow or such an arrow can be associated with the shut-down key.

Additionally or alternatively thereto, the shut-down key can be coloured or able to be illuminated in colour, preferably in a red colour. According to a preferred embodiment, the keys for starting up and for shutting down the injection moulding machine can be configured according to a traffic light system and be formed with the above-mentioned colours "green" for starting up and "red" for shutting down.

According to a further embodiment, three phases can be provided to the starting up of the injection moulding machine and/or three phases can be provided for the shutting down of the injection moulding machine, wherein preferably both for the starting up and also for the shutting down respectively three phases are provided. Consequently, proceeding from a switched off state of the injection moulding machine by actuating the start-up key three times the state of the—generally fully automatic—production operation for the production of injection moulded shaped parts can be started. Likewise, proceeding from the production operation by actuating the shut-down key three times the injection moulding machine can be brought into the switched off state.

Preferably, the control unit is set up in such a way that only the keys for starting up or shutting down the injection moulding machine are illuminated which are available. On starting up the injection moulding machine therefore the shut-down keys are not illuminated, and on shutting down the injection moulding machine the start-up keys are not illuminated. Likewise, the control unit can be set up in such a way that a start-up key can only be actuated again—and accordingly then illuminated again—when the previously started phase is ended and a new phase of starting up can be started. This can likewise be set up in this manner for the shut-down key.

The controlling of the injection moulding machine in the production can take place exclusively via the above-mentioned control elements or respectively keys for the starting up and the shutting down of the injection moulding machine. The remaining control elements of the control unit do not have to be used further by the operator in the production.

In a further development of the invention, provision can be made that in the processing of the phases or between the individual phases a display is generated which causes an operator to execute a specific activity. For example, attention can be drawn to manual activities which must be executed at a specific point in time. For this, provision can be made that an application engineer incorporates appropriate instructions or respectively commands for this into the process. In addition to the above-mentioned machine movement commands and the machine state change commands, therefore commands can be provided which can be added to a sequence and which are programmed or programmable by an application engineer, in such a way that on starting up and/or shutting down of the injection moulding machine at predefinable points in time a display is able to be generated on the control unit, which displays one or more instructions to an operator. As soon as the operator has executed the displayed activity, he can confirm this by actuating a corresponding confirmation key on the control unit. Both the title text and also the instruction description can be inputted by the application engineer in the sequence editor.

BRIEF DESCRIPTION OF THE DRAWINGS

The invention is to be described in further detail below with the aid of an example embodiment. There are shown.

DESCRIPTION OF EXAMPLE EMBODIMENTS

Figure 1:
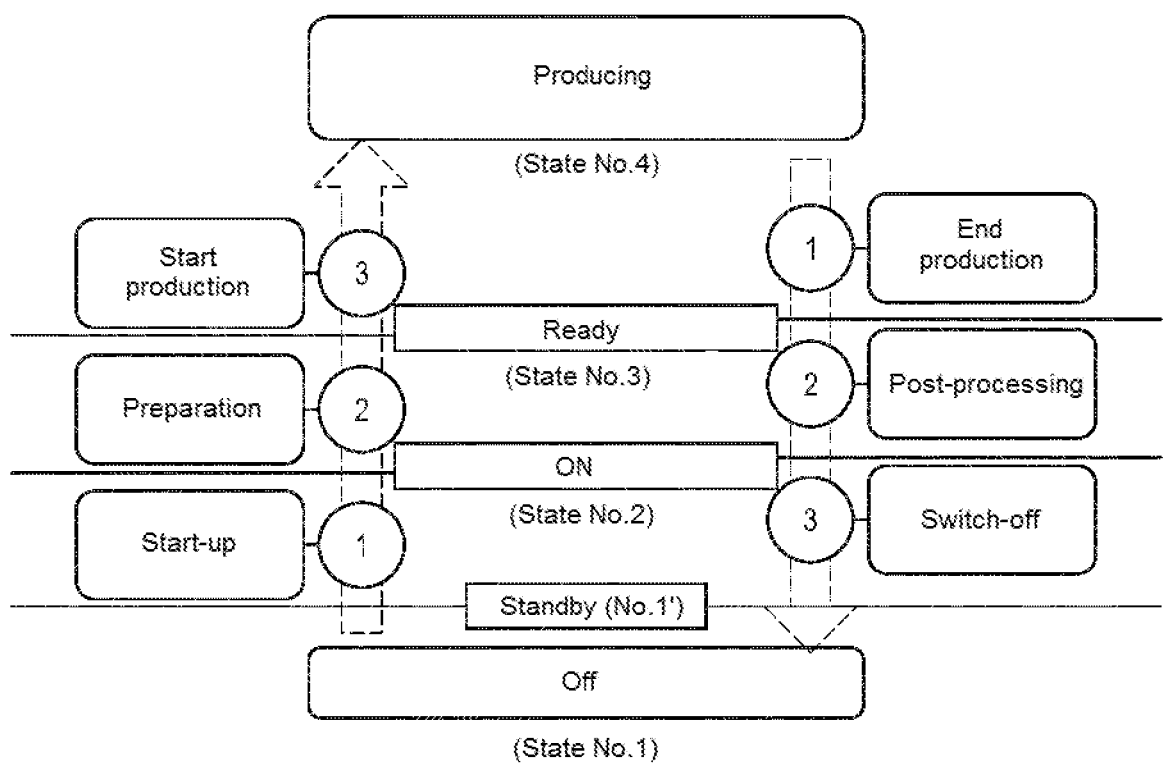
FIG. 1 division of the starting up and shutting down into three phases

FIG. 1 has already been explained above in connection with the presentation of the invention, so that a repetition can be dispensed with at this point.

Figure 2:
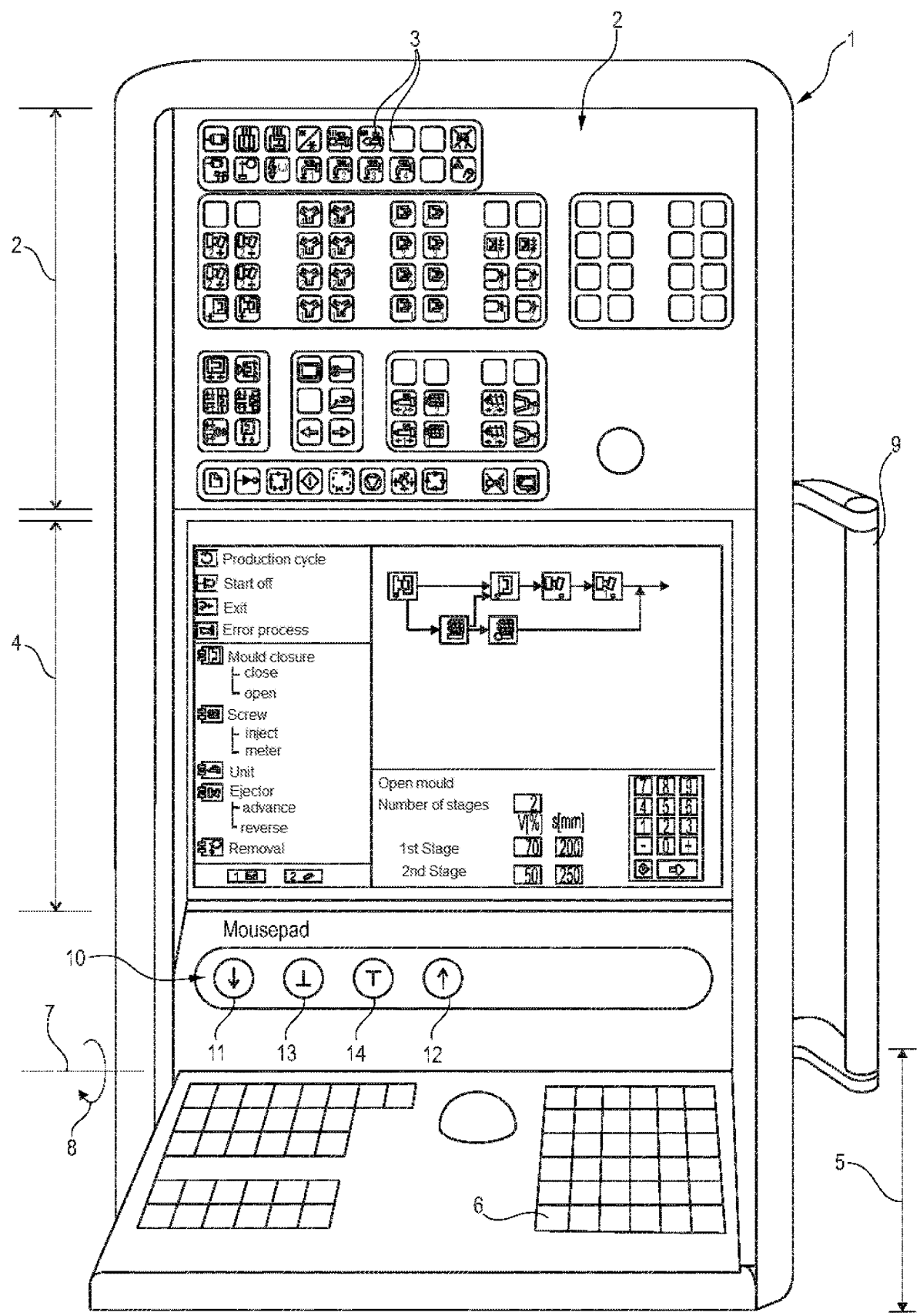
FIG. 2 control unit with additional control panel according to a first embodiment FIG. 3 sequence editor FIG. 4 starting up and shutting down with respectively one key FIG. 5 first embodiment of an additional control panel FIG. 6 second embodiment of an additional control panel FIG. 7 third embodiment of an additional control panel FIG. 8 instruction to an operator FIG. 9 editor for application engineer for programming the instruction according to FIG. 8

FIG. 2 shows a control unit, designated as a whole by reference number 1, as it is known for example from EP2100197B1 named in the introduction. The uppermost sector shows an uppermost control panel 2 with a large number of mechanical keys 3. These concern machine movement keys and machine state change keys with symbols as explained above. The middle sector is a screen 4, on which any illustrations and process sequences can be retrieved and displayed. The retrieval takes place by keys 6 of the lowermost control panel 5. The control panel 5 is able to be unfolded and folded up via a horizontal axis 7 (see arrow 8). By means of a handle 9, the entire control unit 1 can be displaced vertically and/or rotated about the vertical axis. By means of the keys 6 and the screen 4, a process programming of an injection moulding cycle can be carried out. In the same way, individual sequences of the starting up and of the shutting down of the injection moulding machine can be programmed. Both in the process programming and also in the programming of individual sequences, machine movement commands and machine state change commands are displayed on the screen 4 and are put together to form a sequence. The functions of the individual commands are characterized by symbols, as have been described above.

Figure 3:
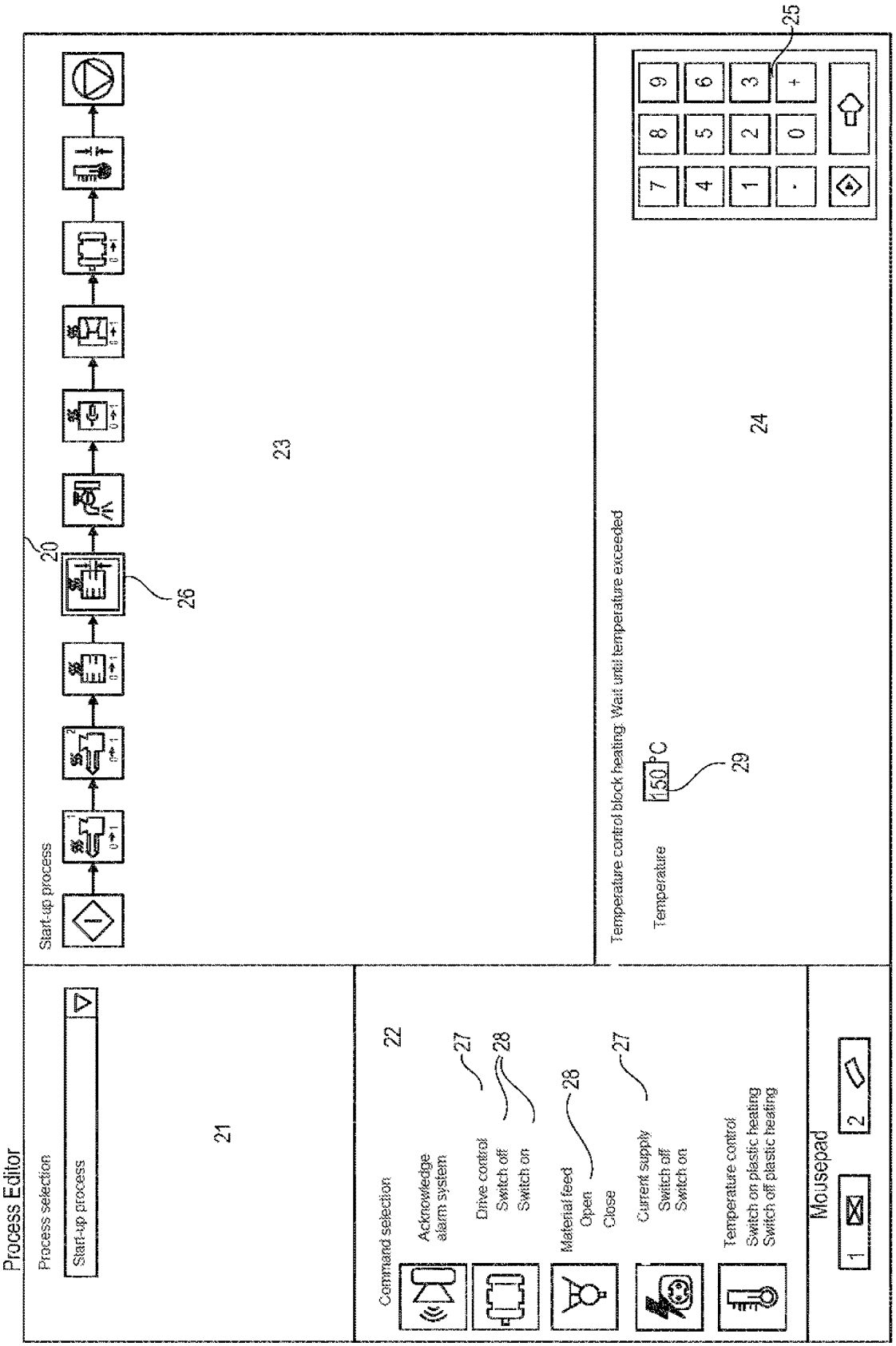

FIG. 3 shows a sequence editor 20, by which individual sequences of the starting up and of the shutting down of the injection moulding machine can be programmed. In the sequence editor, the individual phases of starting up and of shutting down can be programmed—in particular by an application engineer. For this, for each phase a succession of machine movement commands and/or machine state change commands is put together to form a sequence of commands. This is to be explained in further detail by means of Phase 1 of starting up. In the process selection 21, the phase which is to be processed can be selected, in the present case this is the start-up process. Depending on the selected sequence, the command selection 22 is displayed with the components and commands available for this phase. In the actual process area 23 the current sequence is displayed, wherein respectively a command 26 can be selected. The selected command is highlighted in a suitable manner. The associated parameterization of the selected commands is displayed in the parameterization area 24. The number and type of the changeable parameters is differentiated according to a selected command. The focussed parameter 29 can be changed according to characteristic by means of soft keyboard 25 or via an additional hardware keyboard.

In the illustrated sequence, all commands are executed sequentially one after another. The configuration of the process is, however, in no way limited to a purely sequential modelling. Where this makes sense, parallel partial sequences can also modelled.

According to the invention, the control unit 1 is equipped with an additional control panel 10 (see FIG. 2), in which up to four keys are present. These keys can be configured as hardware keys. A first key 11 is provided as shut-down key, and a second key 12 as start-up key. The start-up key can be marked, as illustrated, with an upwardly pointing arrow. Accordingly, the shut-down key can be marked with a downwardly pointing arrow. In addition, there are also two further keys 13 and 14, which are available if necessary for the starting up of intermediate states. The key 13 is marked by an upside-down letter "T", and the key 14 is marked by an upright letter "T". The start-up key 12 can be able to be illuminated in green or can simply only be formed as a green key. The shut-down key 11 can be able to be illuminated in red or can simply only be formed as a red key. With a coloured characterization, the arrows on the keys 11 and 12 can be dispensed with. Likewise, the additional keys 13 and 14 can be illuminated in colour or formed in colour in a suitable manner.

The start-up key 12 is programmed in such a manner that by repeated actuation of this start-up key 12 the respectively next available phase of starting up can be started.

Figure 4:
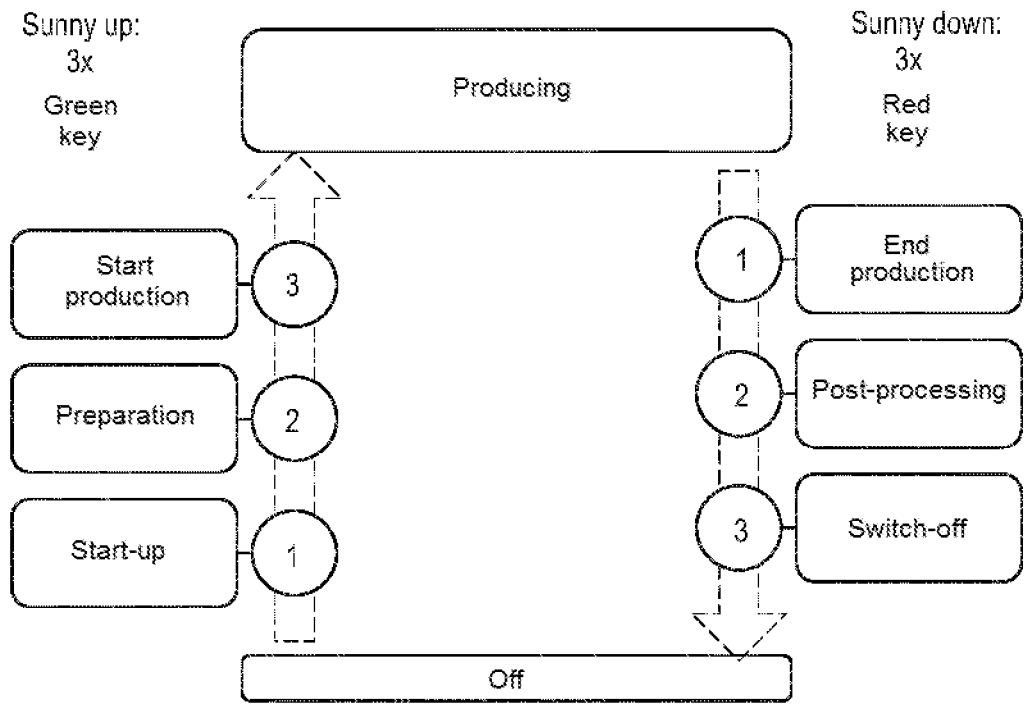

Likewise, the shut-down key 11 is programmed in such a manner that by repeated actuation of this shut-down key, the respectively next available phase of shutting down can be started. As illustrated in FIG. 4, therefore proceeding from state No. 1="OFF", by actuating the start-up key 12 three times, the injection moulding machine can be started up into the production operation according to state No. 4. Likewise, by actuating the shut-down key 11 three times, the injection moulding machine can be shut down from the production operation back into state No. 1.

By actuating the start-up key 12, a phase of start-up is started, and in so doing, a sequence, predefined for this phase of start-up, of specific machine movement commands and/or machine state change commands is activated, and the associated functions are triggered. Accordingly, by actuation of the shut-down key 11 a phase of shut-down is triggered, and in so doing a sequence, predefined for this phase of shut-down, of specific machine movement commands and/or machine state change commands is activated and the associated functions are triggered.

Figure 5:
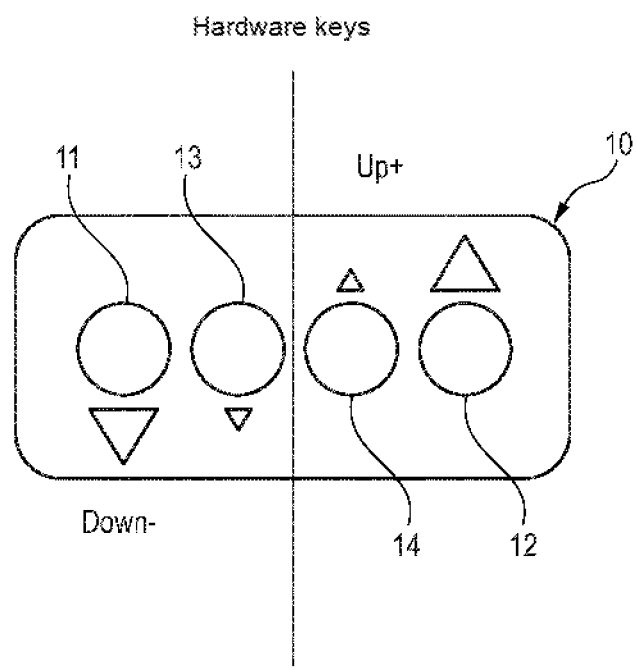

In FIG. 5 the additional control panel 10 according to a further embodiment is illustrated. In addition to the keys 11 and 12 for starting up or respectively shutting down the injection moulding machine, an additional shut-down key 13 and an additional start-up key 14 are provided. These keys 13 and 14 are programmed in such a way that on their actuation a predefined intermediate state is started.

The additional keys 13 and 14 can have a labelling, as described above in connection with FIG. 2. However, a colour characterization can also be provided. For example, the additional start-up key 14 can be illuminated in blue or can simply only be formed as a blue key. The additional shut-down key 13 can be illuminated in yellow or can simply only be formed as a yellow key. The two additional keys 13 and 14 can be used in order to reach other states (e.g. the intermediate "standby" state) or in order to carry out an alternative post-processing. In contrast to the keys 11 and 12, the availability of the additional keys 13 and 14 is able to be configured by the application engineer. During ongoing production, the keys 13 and 14 can be used for example to execute a variant of the production process, e.g. in order to trigger a sampling by the operator, which results in a slightly varied production process.

Figure 6:
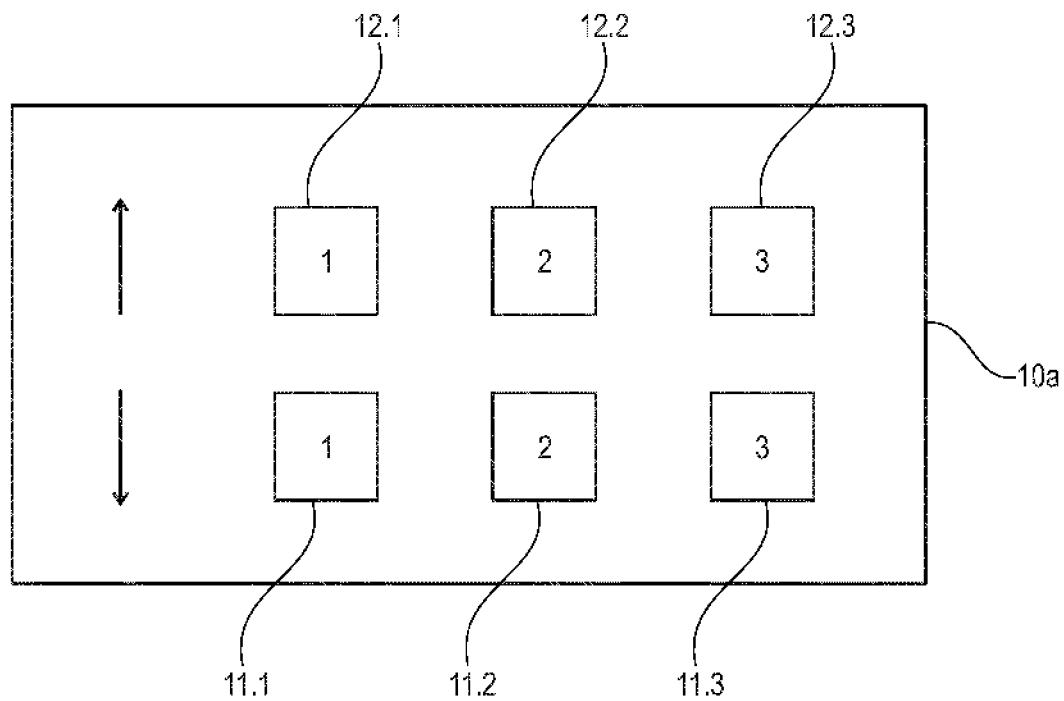

FIG. 6 shows a second embodiment of an additional control panel 10*a* with control elements for the starting up and shutting down of the injection moulding machine. According to this variant, three start-up keys 12.1 to 12.3 and three shut-down keys 11.1 to 11.3 are provided, which are provided with a labelling of the phase which is to be triggered. Accordingly, on actuating of the start-up key 12.1, the first phase of the start-up is triggered. After the end thereof, by actuating the start-up key 12.2 the second phase of the start-up is triggered, and thereafter by actuating the start-up key 12.3, the third phase of the start-up. In an analogous manner, the shut-down keys can be actuated for triggering the phases of the shut-down. In addition to the keys, a labelling can be provided for the meaning of the keys; here, an upwardly pointing arrow is provided for the start-up keys 12.1 to 12.3 and a downwardly pointing arrow for the shut-down keys 11.1 to 11.3. If applicable, the keys can be illuminated in a suitable manner.

Figure 7:
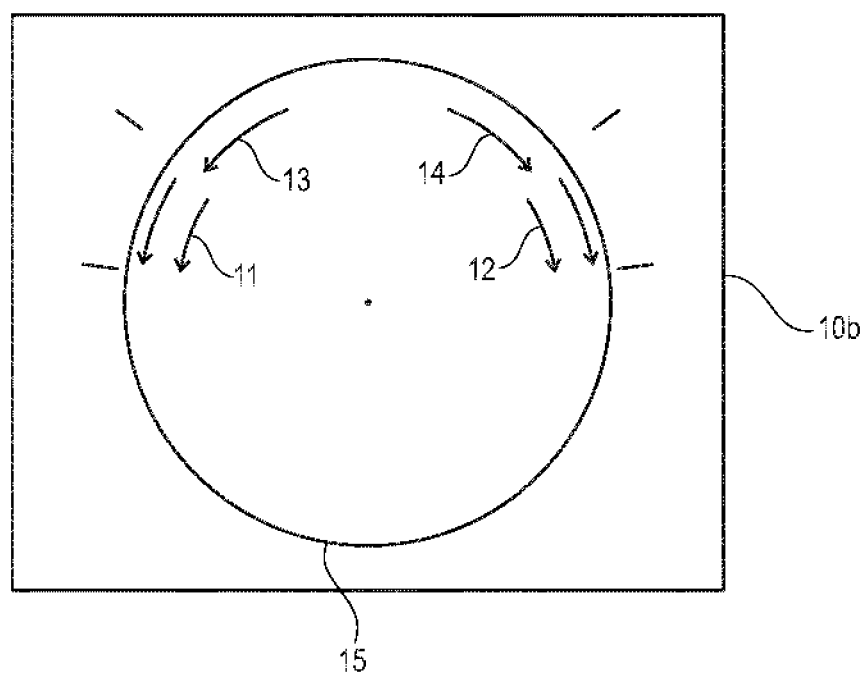

FIG. 7 shows a third embodiment of a control panel 10*b* with a control element for starting up and shutting down the injection moulding machine. Here, a rotary knob 15 is provided as control element. This can be configured and programmed for example in such a manner that on a rotation clockwise the phases P1 to P3 of the start-up are triggered, and on a rotation anticlockwise, the phases P1 to P3 of the shut-down are triggered. A rotary movement with a small deflection (depending on form, also with detent function) corresponds to the keys 13 and 14, a rotary movement with a greater deflection, on the other hand, corresponds to the keys 11 and 12.

The change between the states of the machine and thereby the starting and processing of the individual phases or respectively the activating of the pre-programmed sequences for this, is controlled via the four keys 11, 12, 13 and 14 of the additional control panel 10, wherein preferably respectively only the available keys are illuminated. With each change from one state into another, a machine process is started, which represents the working steps which are to be carried out. Here, the sequence of machine movement commands and of machine state change commands belonging to a phase is executed according to a pre-programmed succession in the background. In which succession the individual working steps are executed, i.e. how a sequence of machine movement commands and of machine state change commands is put together and actuated, can be freely defined by the application engineer. Preferably, the sequence editor, with which the application engineer establishes the succession of machine movement commands and machine state change commands for a sequence is configured so that always only the commands which are useful for the respective process of phase are offered. Thus, for example, in the process for the switching on of the machine (Phase 1, i.e. change from state No. 1 "switched off" into state No. 2 "switched on"), no commands are permitted which trigger a movement of the machine. Accordingly, machine movement commands, the function of which brings about the triggering of travel movements (e.g. closing of the mould), are not offered or not switched to active mode.

Figure 8:
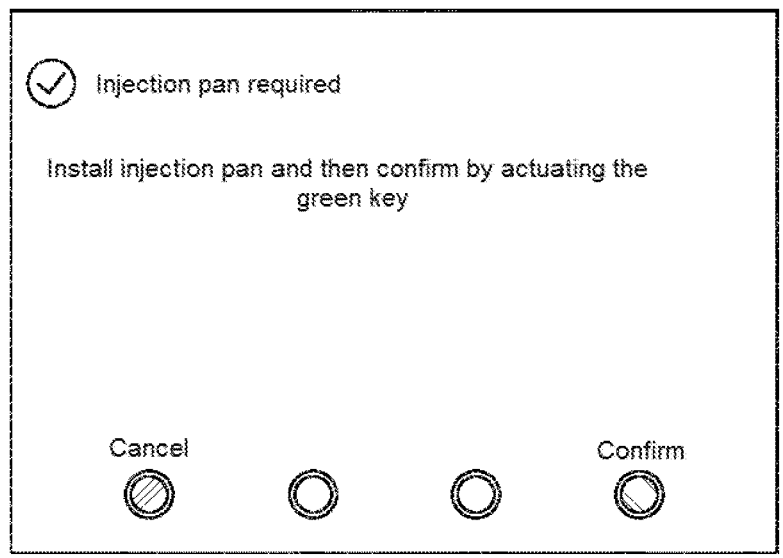
Figure 9:
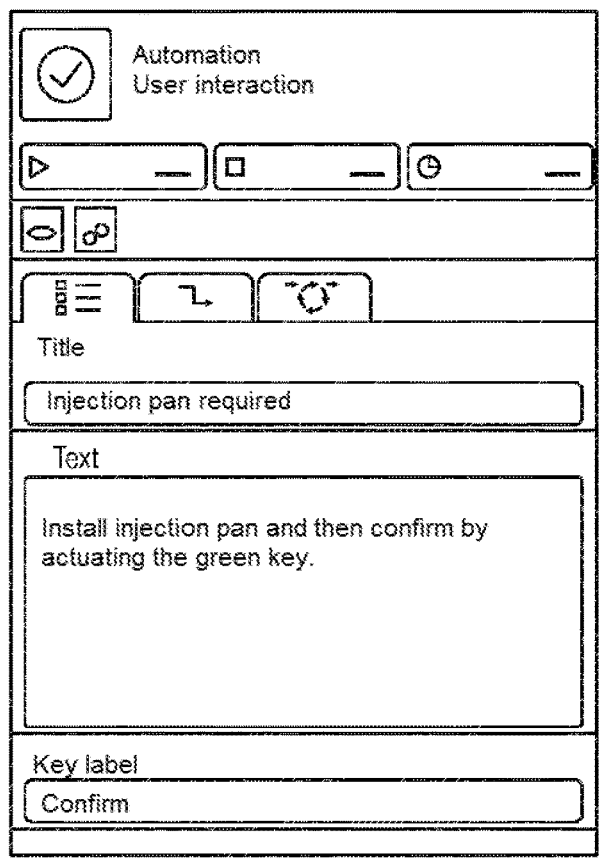
Figure 11:
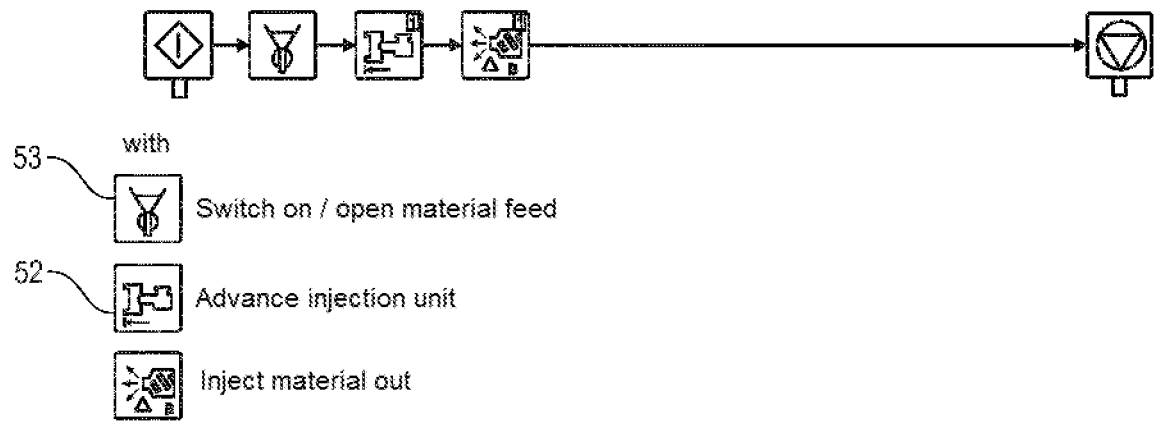
Figure 12:
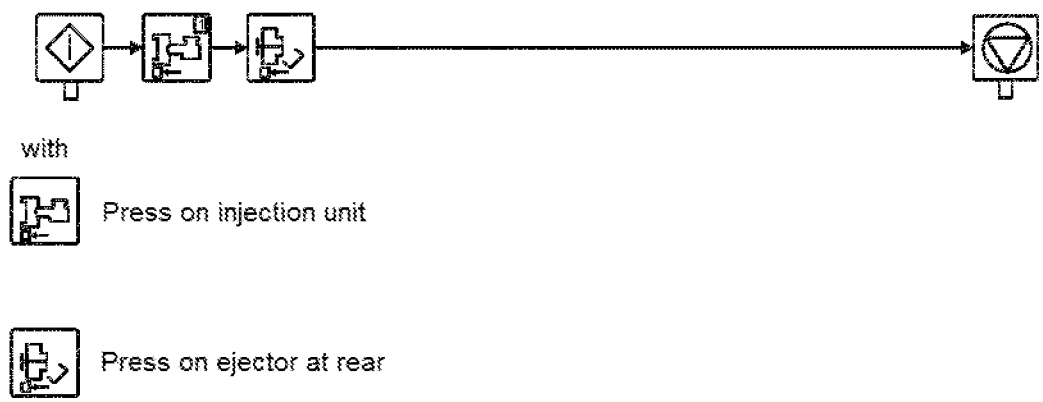
Figure 13:
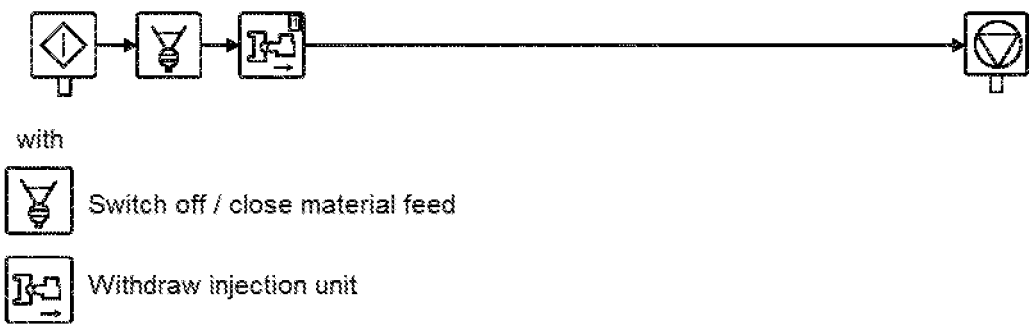
Figure 14:
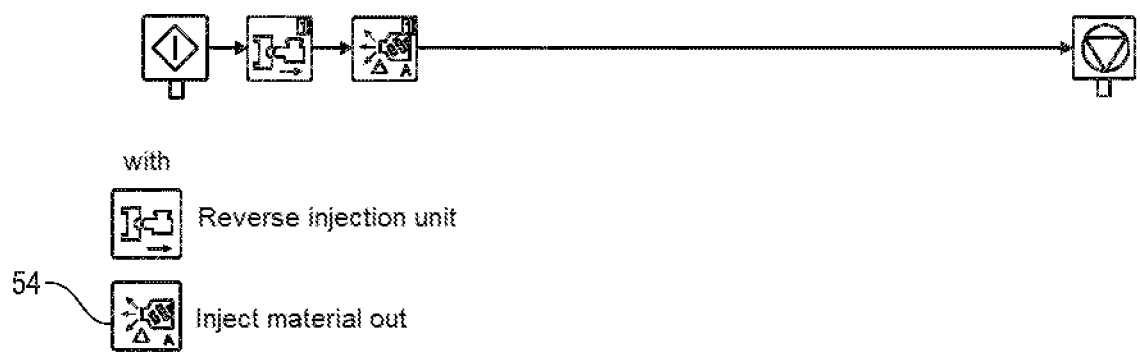

In a further development of the invention, provision can be made that during the running of the phases or between the individual phases, a display is generated which causes an operator to execute a specific activity. For example, attention can be drawn to manual activities which must be executed at a specific point in time. For this, provision can be made that an application engineer incorporates into the process instructions or respectively commands suitable hereto. In addition to the above-mentioned machine movement commands and the machine state change commands, therefore commands can be provided, which are added to a sequence. As soon as the operator has executed the displayed activity, he can confirm this by actuating a corresponding confirmation key on the control unit. Both the title text and also the instruction description can be inputted in the sequence editor by the application engineer. FIG. 8 shows, by way of example, a display in the form of a window which is indicated on a display of the control unit. In the example which is shown here, the concern is with a manual activity prior to injecting-out (corresponding to key 54), which is provided in phase P2 of starting-up. FIG. 9 shows, by way of example, a display on the control unit, by which an application engineer can define an interaction of an operator. The definition made by the application engineer is displayed to an operator in the presentation according to FIG. 8, and namely when during starting up of the injection moulding machine in phase P2 the injecting-out is to take place as the next step.

Depending on application, it is important that the metered plastic does not remain heated up too long in the plasticizing unit. Monitoring operations, which can be configured by the application engineer, make provision that the material is injected out automatically when the material dwell time is exceeded. The operator does not need to worry about this, because with a renewed starting of the production, metering is carried out again automatically and the production is started. This also includes the fact that all the components take up their respective start position again. Likewise, after a longer standstill and without operator interaction, the machine can be switched off or brought into the readiness state. The commands or respectively processes required for this are deposited by the application engineer.

LIST OF REFERENCE NUMBERS

1 control unit
2 first control panel with keys
3 mechanical keys in the first control panel
4 screen
5 second control panel with keys
6 keys in the second control panel
7 horizontal rotation axis
8 rotation direction
9 handle
10 additional control panel—first embodiment
10a additional control panel—second embodiment
10b additional control panel—third embodiment
10 additional control panel
11 shut-down keys
11.1-11.3 shut-down keys—second embodiment
12 start-up key
12.1-12.3 start-up keys—second embodiment
13 additional shut-down key
14 additional start-up key
15 rotary knob
20 sequence editor
21 process selection 21
22 command selection 22
23 process area 23
24 parameterization area 24
25 soft keyboard 25
26 command
27 command
28 command
29 parameter

What is claimed is:

1. An injection moulding machine for producing injection-moulded shaped parts, the injection molding machine comprising:
   a plurality of actuators comprising at least one motor, at least one heating system, and at least one cooling system; and
   a plasticizing unit configured to contain plastic material to be injection-moulded;
   a machine controller comprising a memory storing a plurality of start-up sequences and a plurality of shut-down sequences to operate the injection molding machine, the machine controller configured to:
   control the injection moulding machine according to a plurality of machine movements, and
   change a state of the injection moulding machine from a switched-off state or from a standby state into a production operation state according to a selected one of the plurality of start-up sequences, and
   shut down said machine from the production operation state back into the switched-off or standby state according to a selected one of the plurality of shut-down sequences,
   wherein the selected start-up sequence and the selected shut-down sequence each comprise a plurality of phases, each phase comprising a pre-programmed series of commands which, upon actuation of a user input, are automatically executed by the machine controller in a predetermined order,
   wherein according to successive actuations of the user input, the machine controller is configured to advance through the phases of the selected start-up sequence or the phases of the shut-down sequence, the phases comprising:
- a start-up phase comprising a command turning on one or more actuators of the injection moulding machine to operate a motor and a command to heat &the plasticizing unit to a predetermined temperature,
- a preparation phase comprising a command bringing the plasticizing unit into an injecting-out position and comprising a command injecting-out plastic residue from the plasticizing unit,
- a post-processing phase comprising a command injecting-out plastic residue from the plasticizing unit, and comprising a command to operate one or more actuators of the injection moulding machine to cool the plasticizing unit to a predetermined temperature, and
- a switch-off phase shutting off one or more of the actuators comprising a command shutting off at least one motor, and comprising a command shutting off said at least one heating system and said at least one cooling system.

2. The injection moulding machine according to claim 1, wherein the user input comprises a start-up key for advancing through the selected start-up sequence and a shut-down key for advancing through the selected shut-down sequence.

3. The injection moulding machine according to claim 1, wherein the user input comprises a start-up key, configured to advance through the phases of the selected start-up sequence upon actuation.

4. The injection moulding machine according to claim 1, wherein the user input comprises a shut-down key configured to advance through the phases of the selected shut-down sequence upon actuation.

5. The injection moulding machine according to claim 1, wherein the user input comprises multiple start-up and/or shut-down keys corresponding to phases of the selected start-up and/or shut-down sequence, respectively.

6. The injection moulding machine according to claim 1, wherein the user input comprises a start-up key having an upwardly pointing arrow and/or that the start-up key is coloured or is able to be illuminated in colour.

7. The injection moulding machine according to claim 1, wherein the user input comprises a shut-down key with a downwardly pointing arrow and/or that the shut-down key is coloured or is able to be illuminated in colour.

8. The injection moulding machine according to claim 1, wherein the user input comprises a plurality of start-up keys and/or a plurality of shut-down keys.

9. The injection moulding machine according to claim 1, wherein the user input comprises a rotary knob wherein rotation in one direction advances the machine through the selected start-up sequence and on rotation in the opposite direction advances the machine through the selected shut-down sequence.

10. The injection moulding machine according to claim 1, wherein three phases are provided for the selected start-up sequence of the injection moulding machine, and/or three phases are provided for the selected shut-down sequence of the injection moulding machine.

11. The injection moulding machine according to claim 1, wherein, for a respective state of the selected start-up sequence or the selected shut-down sequence of the injection moulding machine, only a single start-up key corresponding to the selected start-up sequence or to the selected shut-down sequence of the injection moulding machine is illuminated.

12. The injection moulding machine according to claim 1, wherein upon beginning the selected start-up sequence and/or the selected shut-down sequence of the injection moulding machine at predefined points in time a display is able to be generated, which is indicative of one or more instructions.

13. The injection moulding machine according to claim 1, wherein during a first phase of the selected start-up sequence, the injection moulding machine is configured to ensure that all of the shaped parts have been injected correctly and ejected cleanly.

14. The injection moulding machine according to claim 1, wherein each of the plurality of start-up sequences and shut-down sequences are adapted to be saved to the memory by a user, after being programmed.

* * * * *